United States Patent
Huber et al.

(10) Patent No.: US 9,531,081 B2
(45) Date of Patent: Dec. 27, 2016

(54) REFLECTOR ANTENNA FOR A SYNTHETIC APERTURE RADAR

(75) Inventors: Sigurd Huber, Munich (DE); Gerhard Krieger, Gauting (DE); Marwan Younis, Weßling (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 331 days.

(21) Appl. No.: 14/233,816

(22) PCT Filed: Jul. 17, 2012

(86) PCT No.: PCT/EP2012/064000
§ 371 (c)(1),
(2), (4) Date: Apr. 18, 2014

(87) PCT Pub. No.: WO2013/011023
PCT Pub. Date: Jan. 24, 2013

(65) Prior Publication Data
US 2014/0225798 A1 Aug. 14, 2014

(30) Foreign Application Priority Data
Jul. 20, 2011 (DE) .......................... 10 2011 108 159

(51) Int. Cl.
*H01Q 21/00* (2006.01)
*H01Q 19/17* (2006.01)
(Continued)

(52) U.S. Cl.
CPC ............ *H01Q 19/17* (2013.01); *H01Q 3/2658* (2013.01); *H01Q 5/45* (2015.01); *H01Q 15/16* (2013.01); *G01S 13/90* (2013.01)

(58) Field of Classification Search
CPC ........ H01Q 5/45; H01Q 19/17; H01Q 3/2658; H01Q 15/16; G01S 13/90
(Continued)

(56) References Cited

U.S. PATENT DOCUMENTS

| 5,059,966 A | 10/1991 | Fujisaka et al. |
| 5,175,562 A | 12/1992 | Rappaport |

(Continued)

FOREIGN PATENT DOCUMENTS

EP 1 241 487 B1 3/2001

OTHER PUBLICATIONS

International Search Report and Written Opinion for corresponding patent application No. PCT/EP2012/064000 dated Sep. 27, 2012.
(Continued)

*Primary Examiner* — Sue A Purvis
*Assistant Examiner* — Jae Kim
(74) *Attorney, Agent, or Firm* — Renner, Otto, Boisselle & Sklar, LLP (57) ABSTRACT

A reflector antenna for synthetic aperture radar, having a reflector including a reflector surface, a vertex, and an optical axis. The reflector antenna also as a plurality of antenna elements arranged side by side and in a row, for transmitting radar transmission signals and receiving radar reception signals produced from a reflection on a surface. The reflector is designed as a one-dimensional defocused reflector having two focal planes. The optical axis coincides with the line of inter-section of two imaginary planes extending at right angles to one another. The reflector has, in a first (X-) plane, a first (X-) focal plane that extends at right angles thereto and to the optical axis, and, in a second (Y-) plane, a second (Y-) focal plane which extends at right angles thereto and to the optical axis. The second (Y-) focal plane is at a greater distance from the vertex than the first (X-) focal plane.

7 Claims, 5 Drawing Sheets

(51) Int. Cl.
*H01Q 3/26* (2006.01)
*H01Q 15/16* (2006.01)
*H01Q 5/45* (2015.01)
*G01S 13/90* (2006.01)

(58) Field of Classification Search
USPC .............. 343/835, 840, 781 R, 914, 781 P, 775,343/776, 779, 781; 342/25, 157, 371
See application file for complete search history.

(56) References Cited

U.S. PATENT DOCUMENTS

| | | | |
|---|---|---|---|
| 5,202,700 A | 4/1993 | Miller | |
| 6,175,326 B1 | 1/2001 | Kare | |
| 6,211,842 B1 | 4/2001 | Cousin et al. | |
| 8,315,557 B1 * | 11/2012 | Rao | H01Q 1/288 343/761 |
| 2001/0054984 A1 | 12/2001 | Spirtus | |
| 2007/0194977 A1 | 8/2007 | Goutoule et al. | |
| 2009/0262037 A1 * | 10/2009 | Matyas | H01Q 19/12 343/779 |

OTHER PUBLICATIONS

International Preliminary Report on patentability for corresponding patent application No. PCT/EP2012/064000 dated Jan. 23, 2014.
A.Patyuchenko et al.; "Optimization Aspects of the Reflector Antenna for the Digital Beam-Forming SAR System", pp. 954-957, 2010.

* cited by examiner

REFLECTOR ANTENNA FOR A SYNTHETIC APERTURE RADAR

The invention relates to a reflector antenna for a synthetic aperture radar (SAR).

Future satellite-based radar systems with aperture synthesis should utilize digital beam formation technologies. For this purpose, parts of the analog reception hardware are replaced by digital components, which will enhance the flexibility of such systems. The objective consists in obtaining radar images with a large capturing range (i.e. a large strip width) and, at the same time, high resolution. Due to the limited transmission power, a need exists for antennas with large aperture surface which are capable of electronically controlling the antenna lobe across a large angular range. An innovative concept has been found to reside in the use of parabolic reflector antennas in combination with preferably digital feed arrays. The number of the antennas elements and the size of the feed array will depend on the strip width and respectively on the desired resolution. The elements will be placed in the focal plane of the reflector. Such an SAR system is described e.g. in U.S. Pat. No. 6,175,326 B1 or US-A-2007/0194977.

It is an inherent problem of such antenna concepts that each antenna element of the feed array will "see" (illuminate) only a small angular range. Since the "fields of vision" of the individual antenna elements of the feed array hardly overlap each other, malfunction of a feed element will cause a "blind" area.

Reflector antennas are typically realized in the constructional designs of a paraboloid, a parabolic cylinder or a corner reflector. Representative of the state of the art is e.g. the satellite-based radar system SAR-Lupe. In this system, use is made of parabolic reflector antennas having only one feed antenna in the focus or a plurality of feed antennas in the focal plane (U.S. Pat. No. 6,175,326 B1). The pivoting of the antenna lobe is performed mechanically. Another field of application is the signal transmission by means of communication satellites with reflector antennas.

Parabolic reflector antennas with focused feed array, i.e. with the feed array arranged in the focal plane, will in case of failure of a feed array element be "blind" in the respective direction. This inherent problem can be circumvented only by a redundant design of the feed array. In satellite radar systems, this option will entail a massive increase of costs. Further, the redundant electronics will cause losses, e.g. due to additionally required switches. Further still, the total mass of the radar instrument will increase.

A further option according to the current state of the art resides in the use of planar array antennas (EP-B-1 241 487), notably inter alia also with digital beam formation, as described in U.S. Pat. No. 5,059,966 and PATYUCHENCO, A.; et al.: Optimization Aspects of the Reflector Antenna for the Digital Beam-Forming SAR System. In: 8th European Conference on Synthetic Aperture Radar (EUSAR), 2010, pp. 954-957. Of disadvantage herein are the large mass of the antenna and, resulting therefrom, high costs for assembly and transport of the satellite into space.

It is an object of the invention to provide a reflector antenna for an SAR system which is robust against failure of antenna elements or other hardware and respectively circuitry components of the feed array.

According to the invention, to achieve the above object, there is proposed a reflector antenna for a synthetic aperture radar, said reflector antenna comprising a reflector having a reflector surface, a vertex, and an optical axis extending outwards therefrom, and a plurality of antenna elements arranged side by side and in a row, for transmitting radar transmission signals and for receiving radar reception signals generated by reflection on a surface.

In this reflector antenna, it is provided according to the invention that the reflector (20) is designed as a one-dimensionally defocused reflector (20) having two focal planes (40, 42), that the optical axis coincides with the intersection line of two imaginary planes extending at right angles to one another, specifically a first (X-) plane and a second (Y-) plane, that the reflector has, in the first (X-) plane, a first (X-) focal plane that extends at right angles thereto and to the optical axis, that the reflector has, in the second (Y-) plane, a second (Y-) focal plane which extends at right angles thereto and to the optical axis, that the second (Y-) focal plane is at a greater distance from the vertex than the first (X-) focal plane, and that, when viewing the first (X-) plane of the reflector, the antenna elements are arranged side by side along an (X-) line extending in the first (X-) plane, said (X-) line extending at the height of the second (Y-) focal plane.

In the reflector antenna according to the invention, a reflector is used which is one-dimensionally defocused and comprises two focal planes spaced from each other along the optical axis, while, for this reason, the reflector surface of the reflector deviates from the ideal rotationally symmetric parabolic shape on which the reflector antennas of the above mentioned references are based. The reflector surface according to the invention is generated by rotation of a parabola about an axis (notably the optical axis of the reflector) wherein, however, the opening of the parabola will be periodically changed in accordance with the angle of rotation. Obtained thereby is a reflector whose parabolic lines, when viewed along two mutually right-angled intersection planes through the reflector, are open to different extents. Thereby, the reflector—when viewed in the two intersection planes—comprises focal planes located at different distances from the vertex. In this arrangement, the mutually adjacent antenna elements are arranged along a line extending at the height of one of the two focal planes. Thus, in that plane in which there extends the arrangement line of the antenna elements, the antenna elements for reflected radiation are—as desired—defocused, while, in the other plane extending at right angles to the former plane, they continue to be strongly focused.

According to an advantageous embodiment of the invention, it is provided that the line of intersection of the reflector surface with the first (focal) plane describes a first parabola which is opened less wide than a second parabola describing the line of intersection of the reflector surface with the second (focal) plane.

Further, it can be advantageously provided that the antenna elements serve for illuminating a strip-like illumination area on a surface, wherein the lengthwise dimension of the illumination area is oriented parallel to the sequence of the antenna elements arranged side by side, and respectively wherein the lengthwise dimension of the strip-like illumination area and the sequence of the antenna elements arranged side by side are located in a common plane extending at a right angle to the strip-like illumination area.

Finally, the reflector antenna according to the invention can also be provided with a device for digital beam formation.

Thus, the invention relates to a new type of reflector antenna which makes it possible for the first time to combine the advantages of planar antenna arrays, i.e. maintaining the functionality of the antenna in case of failure of an antenna element, with the advantages of reflector antennas, i.e. the provision of large aperture areas. Such reflector antennas can be realized by use of light-weighted materials and thus are particularly suited for satellite-based SAR systems. In reflector antennas, however, in case that some feed array element or other should fail, this would be disadvantageous because the area illuminated by the reflector antenna would include shade areas in which no illumination takes place. Planar antenna arrays, by contrast, are advantageous exactly because a failure of an individual antenna element will not cause non-illuminated areas. If, now, one can combine both antenna systems with each other, as proposed by the invention, one can make use of the respective advantages of both antenna systems. Thereby, the costs of e.g. satellite-based SAR systems can be significantly reduced because the need for expensive redundant reception electronics is obviated.

Fields of application of the antenna of the invention are e.g. earth observation missions by use of SAR systems or all types of radar systems and communication systems on which no maintenance work can be performed. These include primarily satellite-based systems. Further fields of application reside in ground radar systems for military and civilian uses. Ground radar systems can be employed e.g. for air surveillance and meteorological observation.

The invention will be explained in greater detail hereunder by way of an exemplary embodiment and with reference to the drawing. In the several views of the drawing, the following is shown.

Figure 1:
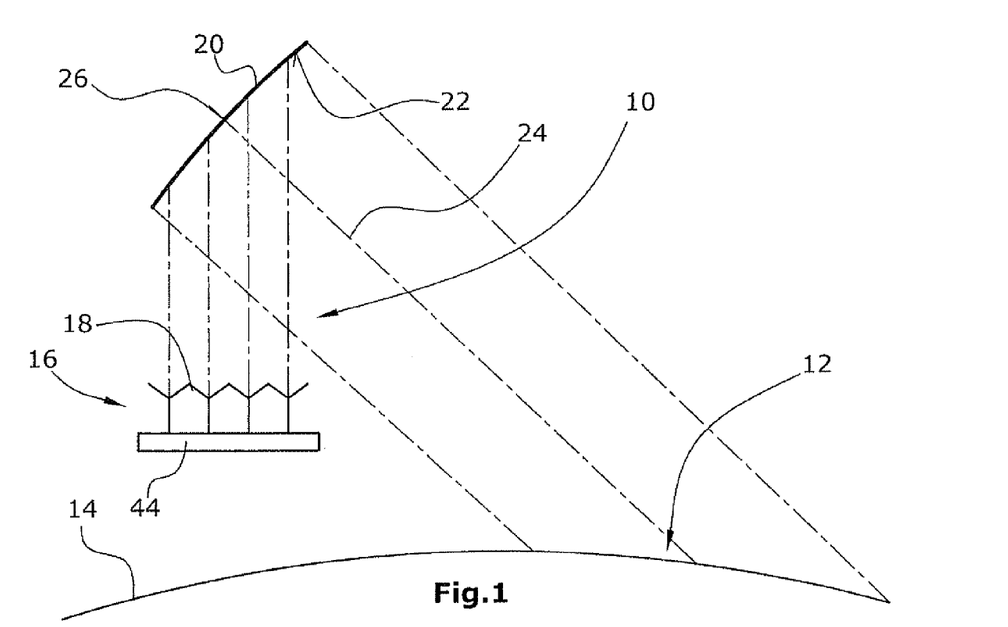
FIG. 1 is a schematic view of an e.g. satellite-based SAR system for illuminating a strip-shaped area e.g. on the surface of the earth.

In FIG. 1, it is illustrated how e.g. a satellite-based SAR system 10 illuminates a strip-shaped area 12 on the earth's surface 14. Said SAR system 10 comprises an array 16 of antenna elements 18. Assigned to the antenna elements 18 is a reflector 20 comprising a reflector surface 22, an optical axis 24 and a vertex 26.

Figure 2:
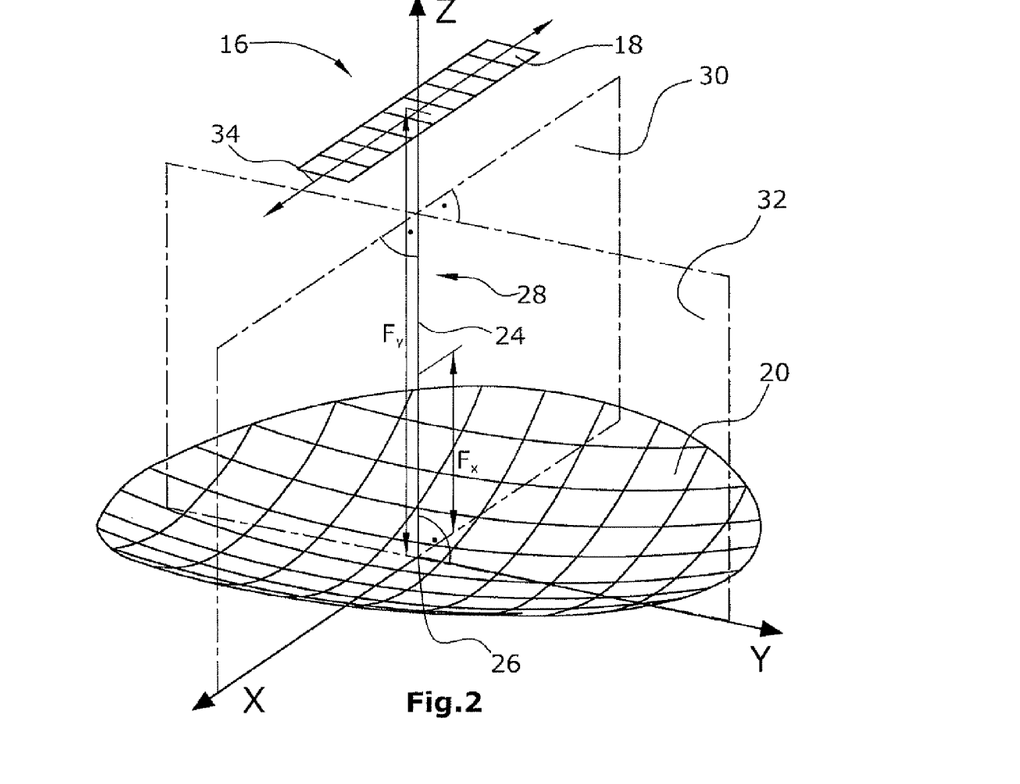
FIG. 2 is a perspective view of the reflector with antenna element (feed) array.
Figure 3:
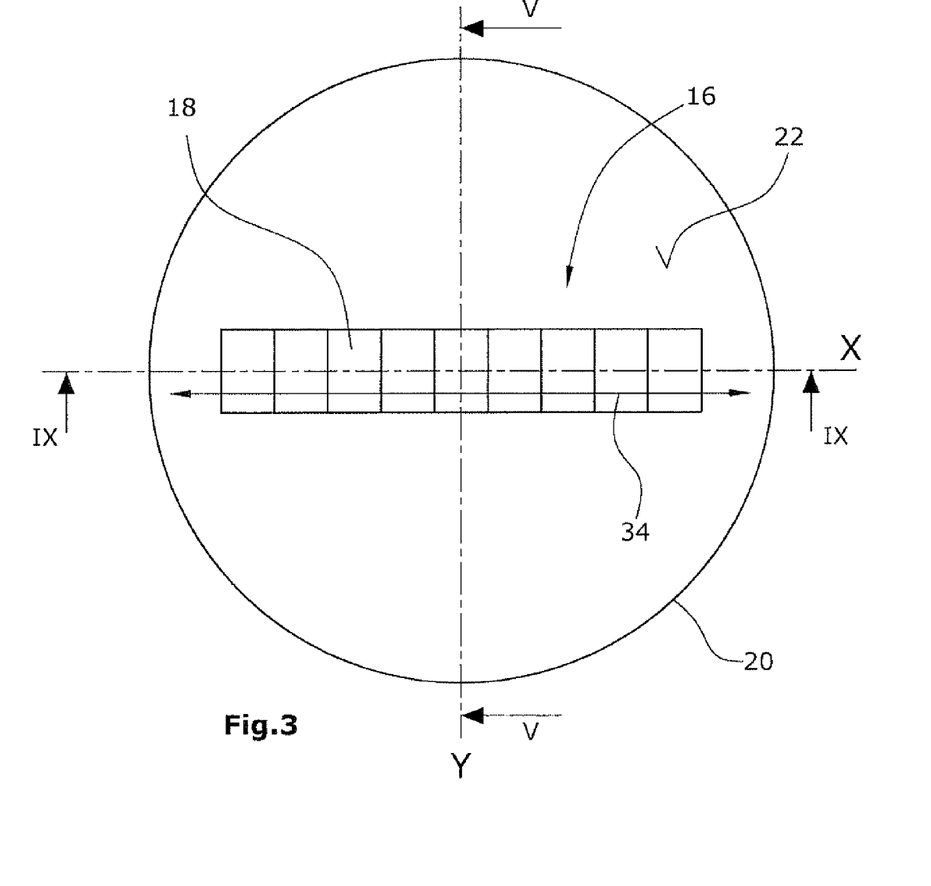
FIG. 3 is a plan view of the reflector with a (feed) array arranged in front thereof.

The reflector 20 comprising said antenna element array 16 is shown in perspective view in FIG. 2 and in plan view in FIG. 3. Based on the Cartesian coordinate cross according to FIG. 2, the optical axis 24 extends in the Z-direction and forms the line of intersection 28 of a first (X-) plane 30 extending in the direction of the X-axis with a second (Y-) plane 32 extending in the direction of the Y-axis. The two planes 30 and 32 are rectangular relative to each other. It can be seen that the extension 34 of the one-dimensional antenna element array 16 (see the double arrow in FIGS. 2 and 3) coincides with extension of the X axis.

Figure 4:
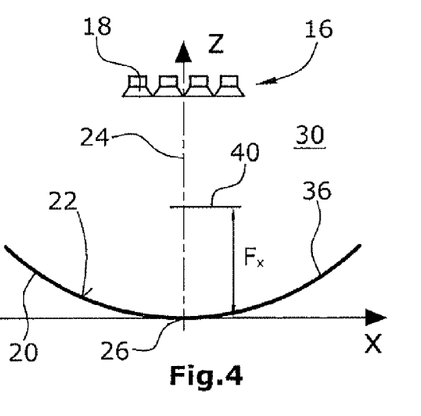
FIG. 4 is a sectional view, taken along the (X-) plane IV-IV of FIG. 3, of the reflector with said (feed) array.
Figure 5:
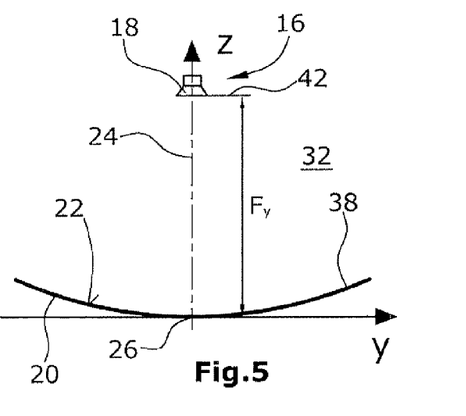
FIG. 5 is a sectional view, taken along the (Y-) plane V-V of FIG. 3, of the reflector with said (feed) array.

The specific design auf the reflector 20 used according to the invention is evident from the sectional views shown in FIGS. 4 and 5. In these Figures, the parabolic shape, represented in FIG. 4 as an intersection line 36 arranged in the (X-) plane 30 and in FIG. 5 as an intersection line 38 arranged in the (Y-) plane 32, is open to varying extents. Thus, in the (X-) plane 30, reflector 20 defines a first (X-) focal plane 40 which is arranged closer to the vertex 26 of reflector 20 than the second (Y-) focal plane 42 formed in the (Y-) plane 32.

The advantages of the defocused reflector 20 according to the invention will be explained hereunder with reference to the exemplary embodiment.

Non-defocused parabolic reflectors are generated, under the geometric aspect, by rotation of a parabola around an axis (e.g. the Z-axis in FIGS. 2, 4 and 5. One property of the reflector surface 22 resides in that a plane wave, incident in an anti-parallel manner relative to the z-axis, will be concentrated in the so-called focal point, briefly called focus. One possibility for defocusing consists in designing the reflector to have two focal points (focal planes 40, 42). The geometric site of the reflector surface 22 can be described in Cartesian coordinates by the equation $$z = \frac{x^2}{4F_x} + \frac{y^2}{4F_y}$$

Herein, Fx and Fy are the focal lengths, as represented in FIGS. 4 and 5.

Figure 6:
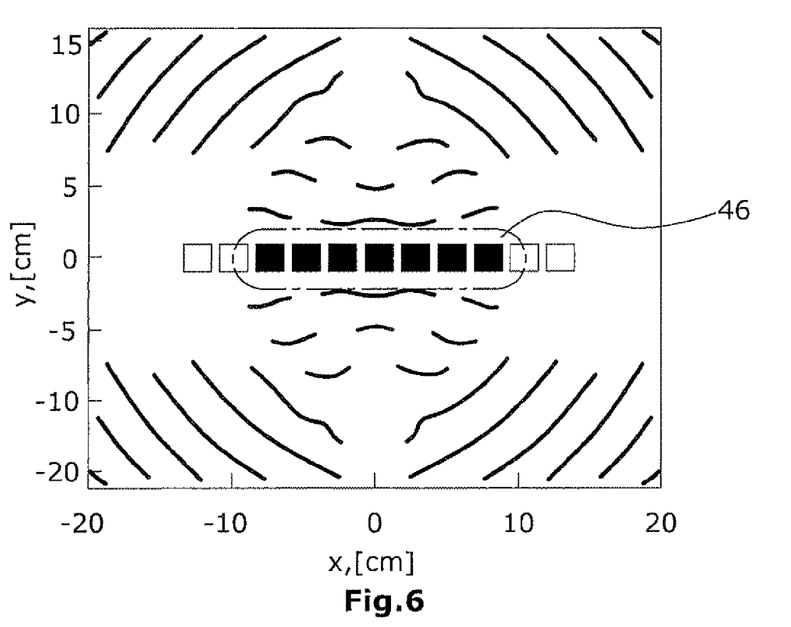
FIG. 6 illustrates the field distribution in the plane through the upper focal point according to FIG. 5, for the reflector having two foci.
Figure 7:
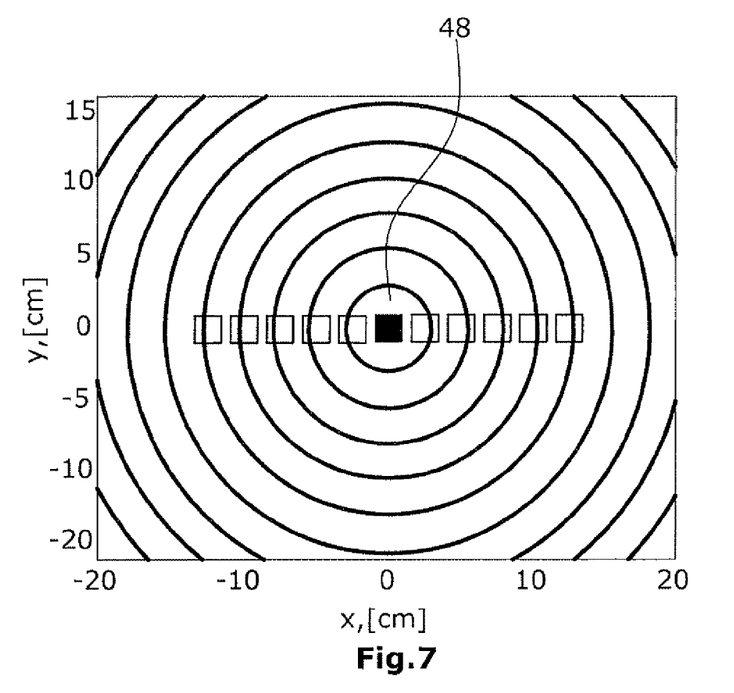
FIG. 7 illustrates the field distribution in the (sole) focal plane for a conventional parabolic reflector having only one focus.

When the antenna element array is placed in one of the two foci (e.g. the upper focus (see FIG. 5)), the scattered field of an incident plane wave is not concentrated anymore in a small surrounding area around the focal point but is distributed in a dimension (e.g. X-dimension) across a larger area, while the field in the orthogonal direction (Y-dimension) remains focused (see FIG. 6). In FIGS. 6 and 7, this is schematically represented by the black squares which indicate the antenna elements 18 receiving the respective reflected radiation. The underlying idea resides in pivoting the antenna beam in only one dimension. Consequently, the overlap between the individual antenna diagrams will be needed only in this dimension. This is evident from the field distributions in the views of FIGS. 6 and 7. FIG. 7 shows the field distribution for an X-band reflector having a conventional parabolic reflector surface, i.e. only one focus. The reflector has a diameter of 7 m with a focal length of $F_x=F_y=5$ m. The field plane illustrated herein is the focal plane z=5 m. The squares represent the elements of the antenna element array, with the black square symbolizing the illuminated antenna element. FIG. 6 shows the field distribution for a reflector having the same diameter but two foci ($F_x=4.9$ m and $F_y=5.1$ m). The field plane is located in the upper focal point at z=5.1 m. Here, it can be seen that a plurality of antenna elements 18 of array 16 are illuminated simultaneously.

Figure 8:
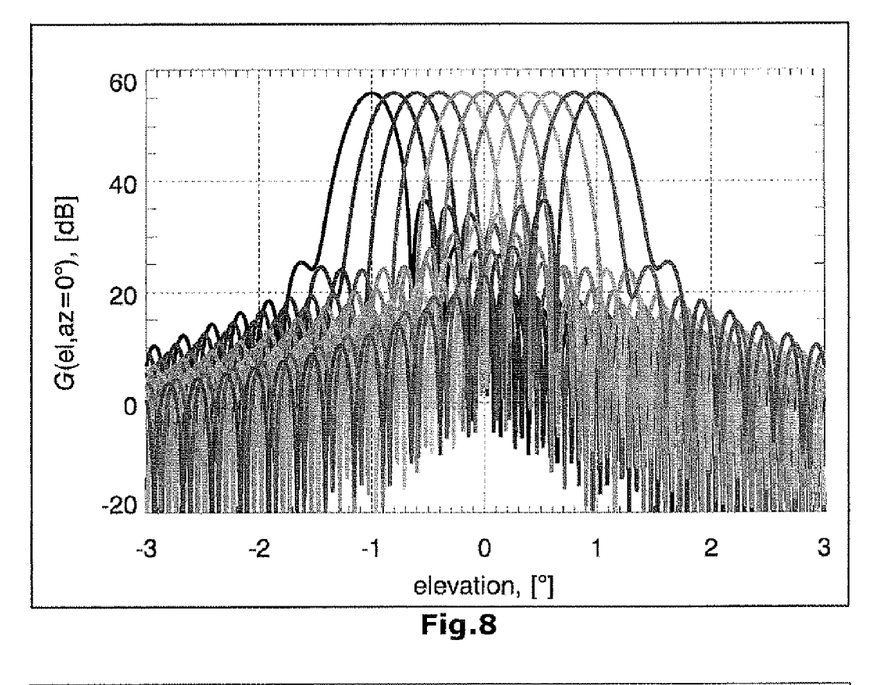
FIG. 8 is a sectional graphic representation of the antenna diagram as a function of the elevation angle for a conventional parabolic reflector having only one focus and—in this example—eleven antenna elements, each antenna diagram relating to a different antenna element.
Figure 9:
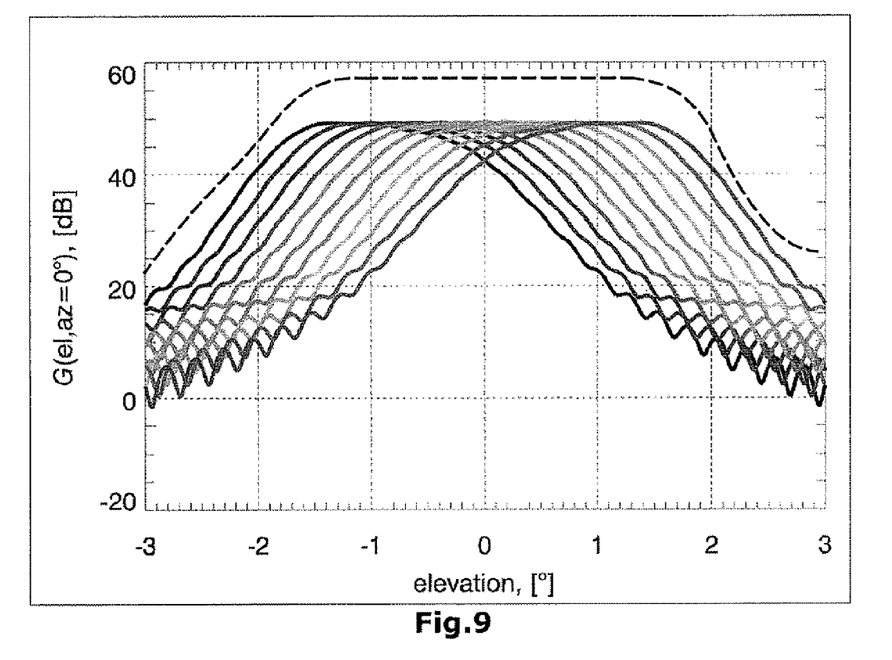
FIG. 9 is a sectional graphic representation of the antenna diagram as a function of the elevation angle for a reflector having two foci as in the reflector according to FIGS. 2 to 5 and—by way of example—again eleven antenna elements.
Figure 10:
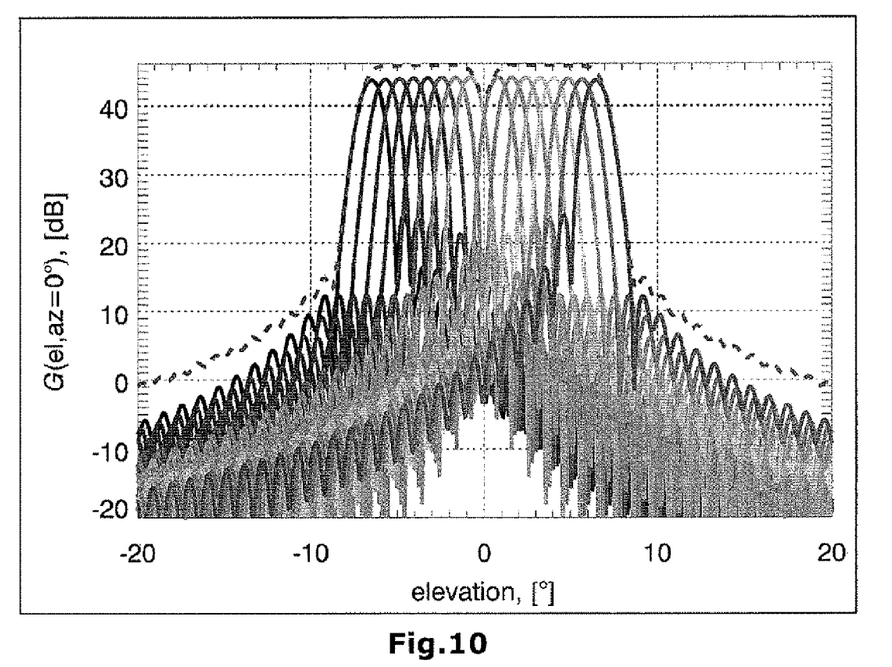
FIG. 10 is a sectional graphic representation of the antenna diagram as a function of the elevation angle for a conventional parabolic reflector having only one focus and—by way of example—again eleven antenna elements, wherein an antenna element in the middle has failed.
Figure 11:
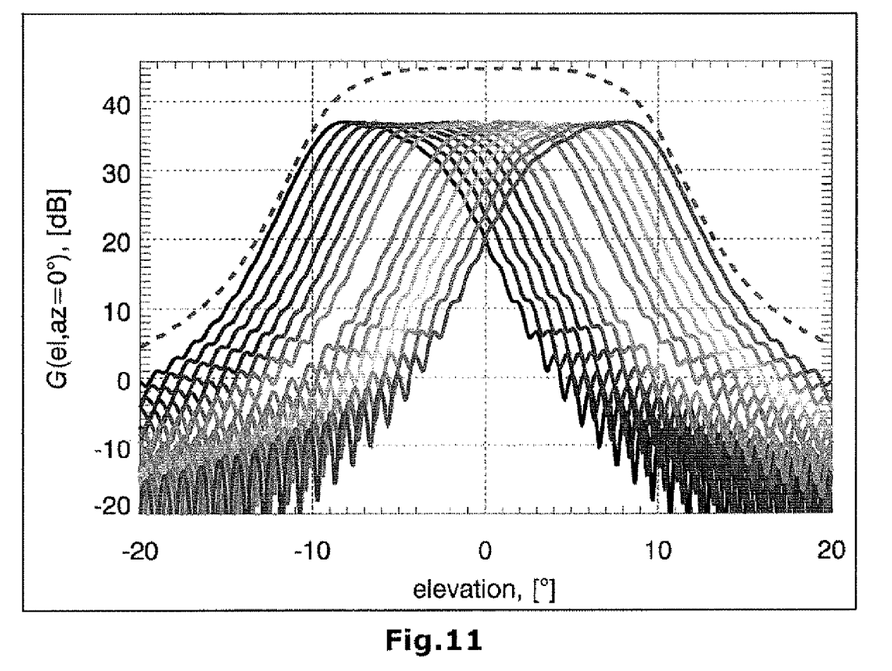
FIG. 11 is a sectional graphic representation of the antenna diagram as a function of the elevation angle for a reflector having two foci as in the reflector according to FIGS. 2 to 5 and—by way of example—again eleven antenna elements, wherein an antenna element in the middle has failed.

The appertaining antenna diagrams for a linear antenna element array comprising eleven elements are shown in FIG. 8, notably as a sectional view of the antenna diagram as a function of the elevation angle when using a conventional parabolic reflector. Each antenna diagram belongs to an antenna element of the array. Here, it is evident that the individual diagrams are overlapping each other only slightly. If one of the antenna elements fails, the respective area will not be sufficiently illuminated anymore. In FIG. 8, the antenna diagrams for the defocused reflector 20 according to FIGS. 2 to 5 are shown. On the one hand, each individual characteristic has just a relatively low gain; however, a higher gain can be generated digitally by beam formation (see the interrupted curve in FIG. 9). For this purpose, a device 44 for digital beam formation is provided. The advantage of this antenna concept according to FIGS. 2 to 5 consists in that, in case of failure of an antenna element, the respective angular range will still be sufficiently illuminated by adjacent elements. This is visualized in FIGS. 10 and 11. FIG. 10 shows the antenna diagrams of a conventional parabolic reflector having a sole focal plane, wherein an antenna element in the middle has failed, causing an indentation in the envelope (see interrupted line). FIG. 11 illustrates that the use of the reflector of the invention has the effect that a failure of said middle antenna element will not significantly impair the overlap (see interrupted line) of the antenna diagrams because, as a result of the well-aimed defocusing, the antenna elements adjacent to the failed antenna element will receive radiation.

In principle, the antenna concept of the invention can be used wherever a high reliability is desired for the overall system. This is the case primarily in antenna systems which do not offer the possibility to perform maintenance work on them, such as e.g. satellite-based antennas.

The above described reflector concept is suited to provide a solution to the redundancy problem, notably by well-aimed defocusing. For this purpose, the three-dimensional field distribution which results from the scattering of a plane wave with the reflector, has been simulated in the area of the focal plane. By variation of the reflector shape, there can be achieved a distribution of the electromagnetic field across a larger area (see the area 46 in FIG. 6 as compared to the area 48 in FIG. 7). In this manner, it is safeguarded that a plurality of elements of the antenna element array, schematically represented by the black squares in FIG. 6, will take up a part of the field energy. Conversely, for reasons of reciprocity, one can derive from this that the electromagnetic power is irradiated across a wider angular range (FIG. 9). This has the consequence that adjacent elements of the antenna element array will illuminate a more extensively overlapping angular range. In case of failure of an element, it is thus guaranteed that this angular range will still remain "visible".

The invention develops its full potential in connection with digital beam formation. In applications such as e.g. satellite-based communication, a defocusing of the reflector is generally to be avoided because it would be accompanied by a loss of antenna gain. In such applications, an effort is undertaken to optimize the antenna beam to the effect that e.g. a continent will be illuminated in an optimal manner. Thus, the objective resides in optimizing the antenna characteristic simultaneously for an entire continuum of directions. As a consequence, each direction will be illuminated with a low gain. In synthetic aperture radars, by contrast, the antenna lobe shall be optimized only for one direction at a given point of time. In the next time step, the signal will come from another direction, and a new antenna beam will be computed. In so far, the loss in gain of an individual antenna element does not pose a problem for the application in the field of synthetic aperture radars since, for each direction, an antenna lobe will be digitally synthesized with high gain.

Characteristic for the novelty of the invention is the geometric shape of the reflector which deviates from the usual reflector shapes.

LIST OF REFERENCE NUMERALS

10 SAR system
12 illuminating area
14 surface of the earth
16 antenna element array
18 antenna elements
20 reflector
22 reflector surface
24 optical axis
26 vertex of the reflector surface
28 line of intersection of the (X-) and (Y-) planes
30 (X-) plane
32 (Y-) plane
34 extension of the succession of the antenna elements
36 line of intersection of the reflector with the (X-) plane
38 line of intersection of the reflector with the (Y-) plane
40 (X-) focal plane
42 (Y-) focal plane
44 device for digital beam formation
46 area of the distribution of the electromagnetic field
48 area of the distribution of the electromagnetic field

The invention claimed is:

1. A reflector antenna for a synthetic aperture radar, said reflector antenna comprising
a reflector having a reflector surface, a vertex, and an optical axis extending outwards therefrom, and
a plurality of antenna elements arranged side by side and in a row, for transmitting radar transmission signals and for receiving radar reception signals generated by reflection on a surface,
wherein
the reflector is designed as a one-dimensionally defocused reflector having two focal planes,
the optical axis coincides with the intersection line of two imaginary planes extending at right angles to one another, specifically a first (X-) plane and a second (Y-) plane,
the reflector has, in the first (X-) plane, a first (X-) focal plane that extends at right angles thereto and to the optical axis,
the reflector has, in the second (Y-) plane, a second (Y-) focal plane which extends at right angles thereto and to the optical axis,
the second (Y-) focal plane is at a greater distance from the vertex than the first (X-) focal plane, and when viewing the first (X-) plane of the reflector, the antenna elements are arranged side by side along an (X-) line extending in the first (X-) plane, wherein the shape of the reflector surface in a Cartesian coordinate system, with its origin in the vertex of the reflector, is defined as follows:

$$z = \frac{x^2}{4F_x} + \frac{y^2}{4F_y}$$

wherein z coincides with the optical axis, x coincides with the extension of the first (X-) plane and y coincides with the extension of the second (Y-) plane and $F_x$ is the distance of the first (X-) focal plane from the vertex of the reflector and $F_y$ is the distance of the second (Y-) focal lane from the vertex of the reflector, said (X-) line extending at the height of the second (Y-) focal plane.

2. The reflector antenna of claim 1, wherein the line of intersection of the reflector surface with the first (X-) plane describes a first (X-) parabola which is opened less wide than a second (Y-) parabola describing the line of intersection of the reflector surface with the second (Y-) plane.

3. The reflector antenna of claim 1, wherein the antenna elements are provided for illuminating a strip-like illumination area on a surface of the earth, wherein the lengthwise dimension of the illumination area is oriented parallel to the sequence of the antenna elements arranged side by side, and respectively the lengthwise dimension of the strip-like illumination area and the sequence of the antenna elements arranged side by side are located in a common plane extending at a right angle to the strip-like illumination area.

4. The reflector antenna of claim 1, including a device for digital beam formation.

5. The reflector antenna of claim 2, wherein the antenna elements are provided for illuminating a strip-like illumination area on a surface of the earth, wherein the lengthwise dimension of the illumination area is oriented parallel to the sequence of the antenna elements arranged side by side, and respectively the lengthwise dimension of the strip-like illumination area and the sequence of the antenna elements arranged side by side are located in a common plane extending at a right angle to the strip-like illumination area.

6. The reflector antenna of claim 2, including a device for digital beam formation.

7. The reflector antenna of claim 3, including a device for digital beam formation.

\* \* \* \* \*